United States Patent [19]
Ymse

[11] Patent Number: 4,909,318
[45] Date of Patent: Mar. 20, 1990

[54] METHOD AND APPARATUS FOR RECOVERING HEAT FROM FLUE GASES AND FOR CLEANING THE SAME

[75] Inventor: Gunnar Ymse, Lund, Sweden

[73] Assignee: Alfa-Laval Thermal AB, Tumba, Sweden

[21] Appl. No.: 240,123

[22] PCT Filed: Mar. 18, 1987

[86] PCT No.: PCT/SE87/00140
§ 371 Date: Aug. 31, 1988
§ 102(e) Date: Aug. 31, 1988

[87] PCT Pub. No.: WO87/05686
PCT Pub. Date: Sep. 24, 1987

[30] Foreign Application Priority Data
Mar. 19, 1986 [SE] Sweden ............................ 8601274
Jun. 18, 1986 [SE] Sweden ............................ 8602709

[51] Int. Cl.⁴ ............................................. F28F 9/26
[52] U.S. Cl. ............................... 165/145; 165/111; 165/162; 165/163; 165/95; 122/20 B
[58] Field of Search ............... 165/111, 145, 162, 163, 165/905, 909; 122/20 B

[56] References Cited

U.S. PATENT DOCUMENTS 2,693,346 11/1954 Petersen ........................... 165/163 X
3,240,675 3/1966 Weber ............................. 165/163 X
4,619,317 10/1986 Disselbeck et al. ................. 165/162

FOREIGN PATENT DOCUMENTS 439195 6/1985 Sweden.

Primary Examiner—Martin P. Schwadron
Assistant Examiner—Allen J. Flanigan
Attorney, Agent, or Firm—Davis Hoxie Faithfull & Hapgood

[57] ABSTRACT

The present invention relates to a method for recovering heat and separating substances from a flue gas streaming through a heat exchange apparatus comprising a casing with heat exchange elements inserted thereinto, a medium being provided for absorbing heat from the flue gas. According to the invention the medium that shall absorb heat from the flue gas is conducted through the heat exchange elements, the heat exchange elements and the connections to the casing for flue gas being so placed that the flue gas streams perpendicularly to the heat exchange elements, the flue gas being given a flow velocity cross the heat exchange elements of not more than 3 m/sec. Soot in the flue gas is collected on the heat exchange elements and adsorbs and/or dissolves gaseous substances such as sulphur dioxide. The invention also relates to an apparatus for carrying out the method.

5 Claims, 5 Drawing Sheets

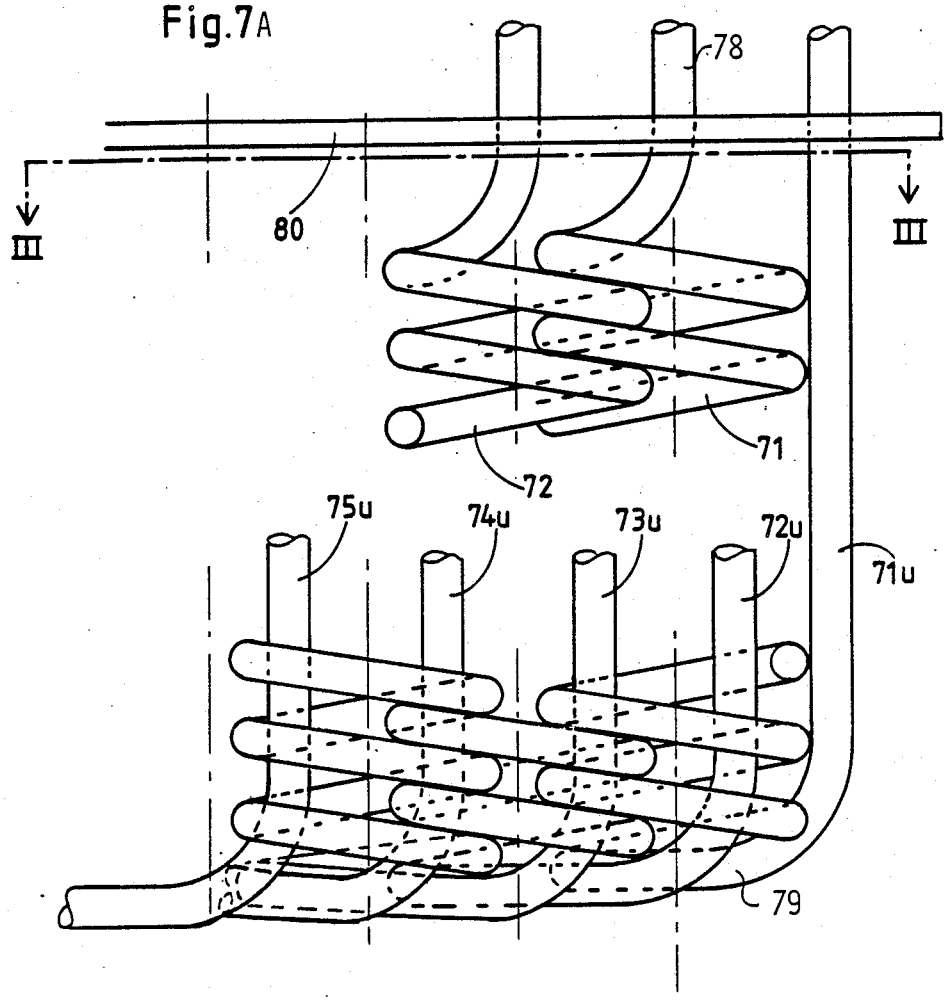
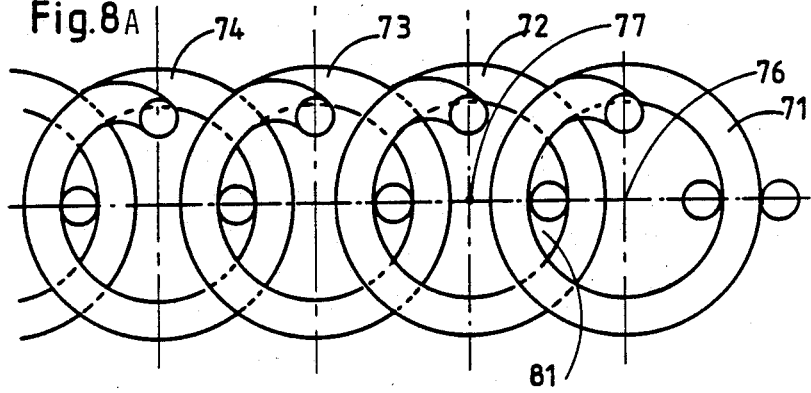

METHOD AND APPARATUS FOR RECOVERING HEAT FROM FLUE GASES AND FOR CLEANING THE SAME

This invention relates to a method and an apparatus for recovering heat and separating substances from a flue gas streaming through a heat exchange apparatus.

During combustion of oil and other fossil fuels, there are formed flue gases containing carbon oxides, sulphur oxides, nitrogen oxides, water vapour and soot particles. Other gaseous chemicals can be present in the flue gases from other types of fuels. These flue gases are normally blown out into the air via a chimney. Flue gases from combustion of fuel thus contribute to atmospheric pollution and increased acidity in lakes and rivers. Actions are taken to reduce the atmospheric pollution, e.g. reduce the sulphur content in the fuel or clean the flue gases. Almost all sulphur in the fuel is oxidized to $SO_2$ during combustion and a small part is further oxidized to $SO_3$. When cooling the flue gases the $SO_3$ reacts with water vapour and form sulphuric acid. The $SO_2$ can partly be dissolved in condensed moisture, specially in the presence of sulphuric acid, and forms sulphurous acid. Cooling of the flue gases leads to corrosion of heat exchangers and chimneys thereby reducing the possibility of recovering all the heat from the combustion of the fuel. Further, the condensed acid causes a conglomeration of oil and soot particles present in the flue gases.

A known method is to cool the flue gases in a heat exchanger whereby the sulphuric acid is condensed and separated from the flue gases. When cooling the flue gases, the heat can be recovered reducing the amount of fuel to the boiler.

According to a known apparatus (see FIG. 1) the flue gases from a combustion room are introduced to a flue gas cooler commmprising a vertical heat exchanger provided with long straight tubes 10 of a material which shall resist corrosion. The flue gases stream inside the tubes at high velocity (more than 5 m/sec) partly so that the soot shall not fasten on the inner tube wall and partly that a high heat transfer shall be obtained. Between the tubes a liquid, for instance water, is heated by the flue gases inside the tubes 10.

The known apparatus, however, is impaired by a serious drawback. The design of the apparatus and the high gas velocity makes the separation degree for the sulphur low. Only 10-30% of the sulphur content in the fuel can be removed from the flue gases.

The present invention aims to recover energy from flue gases, to improve the cleaning of the flue gases, especially reducing the sulphur content in the same and to make a heat exchanger of corrosion resistant plastic material. This purpose has been solved as is apparent from the description of the invention and the attached claims.

According to the invention there is provided a method for recovering heat and separating substances from a flue gas streaming through a heat exchange apparatus comprising a casing with heat exchange elements inserted thereinto, a medium being provided for absorbing heat from the flue gas, characterized in that the medium that shall absorb heat from the flue gas is conducted through the heat exchange elements and has a temperature which is lower than the dew point of sulphuric acid, that the heat exchange elements are so placed inside the casing of the heat exchanger and the connections to the casing for flue gas so made that the flue gas streams essentially perpendicularly to the longitudinal axis of the heat exchange elements, that the flue gas is given a flow velocity cross the heat exchange elements of not more than 3 118 m/sec.

that water vapour and sulphur trioxide in the flue gas form sulphuric acid when the flue gas is cooled, the sulphuric acid being condensed onto the outer walls of the heat exchange elements, that soot in the flue gas is collected on the heat exchange elements and this soot can adsorb and/or dissolve gaseous substances, such as sulphur dioxide, and that the soot particles, sulphuric acid and the adsorbed or dissolved $SO_2$ on the heat exchange elements are removed from the heat exchange elements when the capcity of the soot layer to adsorb and/or dissolve sulphur dioxide has been reduced.

According to the invention there is also provided a heat exchange apparatus for recovering heat and separating substances from a flue gas and suitable to use for the method according to claim 1, characterized by the combination of the following features:

a casing provided with connections for a first incoming and outgoing medium and comprising inlet and outlet modules, side modules and bottom and top modules;

heat exchange elements in the form of plastic tubes for a second medium inside the casing, each of the tubes having helical form and two ends intended to be connected to means for incoming and outgoing, respectively, medium;

the helical, plastic tubes and the connections for the first medium being so arranged that this medium streams essentially perpendicularly to the longitudinal axis of the helical tubes;

the helical plastic tubes being so located in relation to each other that the distance between the centers of two adjacent tubes is less than the sum of the radii of the circles circumscribing the two tubes;

two adjacent helical tubes being locked in relation to each other by another helical tube, one end of which being inserted into the common space of the two adjacent tubes;

the two ends of each plastic tube going through a plate of the bottom module and/or the top module of the casing via holes in the plate, each tube end being sealingly applied into the respective hole of the plate;

each side module comprising a metallic plate and an insulation covered by a plastic layer, the plastic layer being in contact with the first medium.

The design, described above, of the heat exchanger will make the heat transfer and the cleaning of the flue gas more effective and the construction will be simple and costsaving.

According to a development of the invention the heat exchange apparatus comprises plastic tubes, which are placed in rows after each other inside the casing of the heat exchanger so that the plastic tubes fill out the space inside the casing both in its transversal direction and its longitudinal direction. By this arrangement the space inside the casing is very effectively utilized, and therefore there will be room for many plastic tubes. Due to that fact the heat transfer will be still more improved.

According to a further development of the invention the plastic tubes in the rows are alternately left-hand screwed and right-hand screwed. Due to that fact the two different twisting tendencies arising in left-hand screwed and right-hand screwed plastic tubes can counteract and balance each other, whereby the geometrical form of the heat surface of the plastic tube can be maintained both in the cold and the warm state.

According to a further development of the invention the metallic plate of the module is of essentially the same size as the module and has a frame going round the plate on one side and is provided with the insulation on its other side, which insulation is airtightly and liquid-tightly enclosed by the plastic layer. That means that the insulation protects the plastic tubes from being in contact with the metal wall which might have a high temperature above the melting point of the plastic material. Hereby the casing will not damage the plastic tubes.

According to a further development of the last-mentioned embodiment the modules are kept together by means of bolts going through the frame of the respective module, the sealing between the modules being brought about by means of a gasket made of a plastic material. Due to that fact the installation of the casing will be costsaving and the heat exchange elements easily exchangeable.

The invention will in the following be described in more detail with reference to the accompanying drawings, in which FIG. 1 shows a known heat exchanger for use in cooling and cleaning flue gases, FIG. 2 shows a schematic view of an apparatus for cleaning flue gases according to the invention comprising a heat exchanger in a flue gas channel and an equipment for cleaning the heat exchanger, FIG. 3 shows a transverse section through a schematically shown heat exchanger provided with heat exchange elements in the form of helical tubes for use in the apparatus according to FIG. 2, FIG. 4 shows a horizontal section of the heat exchanger according to FIG. 3, taken along the line IV—IV, FIG. 5 shows a module according to the invention, FIG. 6 shows a section through the module according to FIG. 5, taken along the line IV—IV.

FIG. 7A shows a preferred embodiment of the tube arrangement in one row of the heat exchanger and FIG. 7B shows a tube arrangement in which the tubes are alternately left-hand screwed and right hand screwed FIG. 8A shows a horizontal section of FIG. 7A, taken along the line VIII—VIII.

Figure 1:
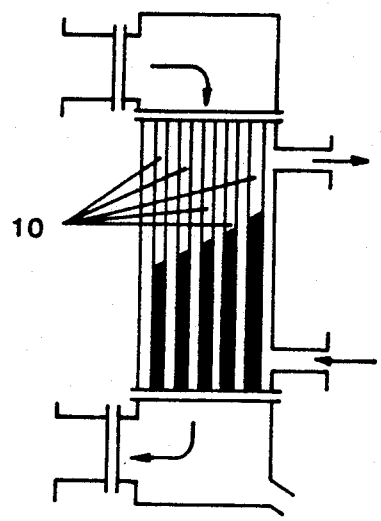

The apparatus shown in FIG. 1 has been described in the introductory part of the description and does not need to be mentioned any more.

Figure 2:
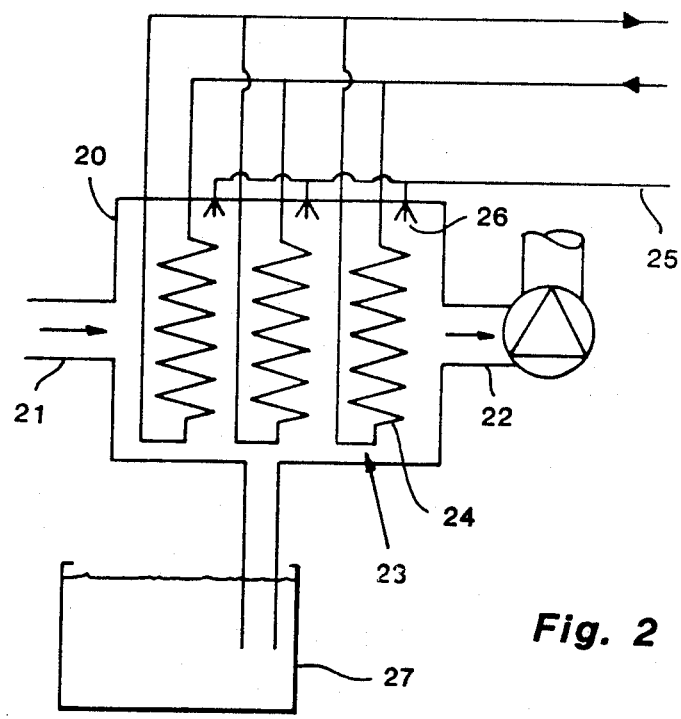

In FIG. 2 there is shown schematically an apparatus for cleaning the gases, comprising a heat exchanger and an equipment for cleaning the heat exchanger, which apparatus gives a very good separation of sulphur from the flue gases. Moreoever the heat exchanger is very effective regarding the recovery of heat from the flue gases.

The apparatus comprises a casing 20 provided with an inlet and an outlet for the flue gas from a not shown combustion station. Inside the casing there are a plurality of heat exchange elements in the form of helical tubes, in which the medium is conducted which is to absorb heat from the flue gas and cool down that medium.

The tubes are so located in the casing that the flue gases stream essentially perpendicularly to the longitudinal axis of each helical tube, the heat in the flue gas is transferred to the medium in the tube, which medium has a temperature that is lower than the condensation temperature of the sulphuric acid.

The material in each tube is preferably a plastic which is resistant to sulphuric acid. The plastic material makes the tubes cheap to produce and easy to bend into the helical form.

Another important feature in the invention is that the velocity of the flue gas in the heat exchanger is low, maximum 3 m/sec. This fact, in combination with the placing of the tubes and the material they are made of gives the intended effect, i.e. a high separation of sulphur (ca. 50%) from the flue gases. The reason is as follows.

The flue gas from oil and fossil fuels contains, as has been previously mentioned, soot particles and among other chemicals sulphur oxides, which oxides comprise sulphur dioxide and a small percentage of sulphur trioxide. When cooling down the flue gas in the heat exchanger, sulphuric acid formed of water vapour and sulphur trioxide is condensed onto the cold tube walls, which will be wetted by the sulphuric acid. The condensed acid causes a conglomeration of oil and soot particles resulting in a cleaning effect of the flue gases flowing through the heat exchanger. As the velocity of the flue gases is low much soot will fasten onto the tube wall. The wetted soot can dissolve and/or adsorb gaseous chemicals such as $SO_2$. To this effect the emission of chemicals and particles from the flue gases is reduced thus decreasing the atmospheric pollution.

An explanation to the reduction of gaseous chemicals in the flue gases is partly that $SO_2$ is dissolved in condensed moisture, especially in the presence of sulphuric acid, partly that soot is a carbon chemical which has a similar effect as active carbon when adsorbing chemicals from a gas. However, an adsorbing mechanism is reduced after some time, as well as at temperatures above 110° C. In order to re-establish the absorption effect, the soot layer on the tubes is removed and a new layer of soot will gradually form again as described above. The removal of the soot layer also reduces the fouling which has a negative effect on the heat transfer.

The removal of soot can be done by flushing with water. Thus, water from a pipe line 25 is sprayed via nozzles 26 over the heat exchanger tubes 23. The soot with sulphuric acid and sulphur dioxide is removed to a collecting tank 27 under the heat exchanger. After the flushing the heat exchanger is ready for use again.

Figure 3:
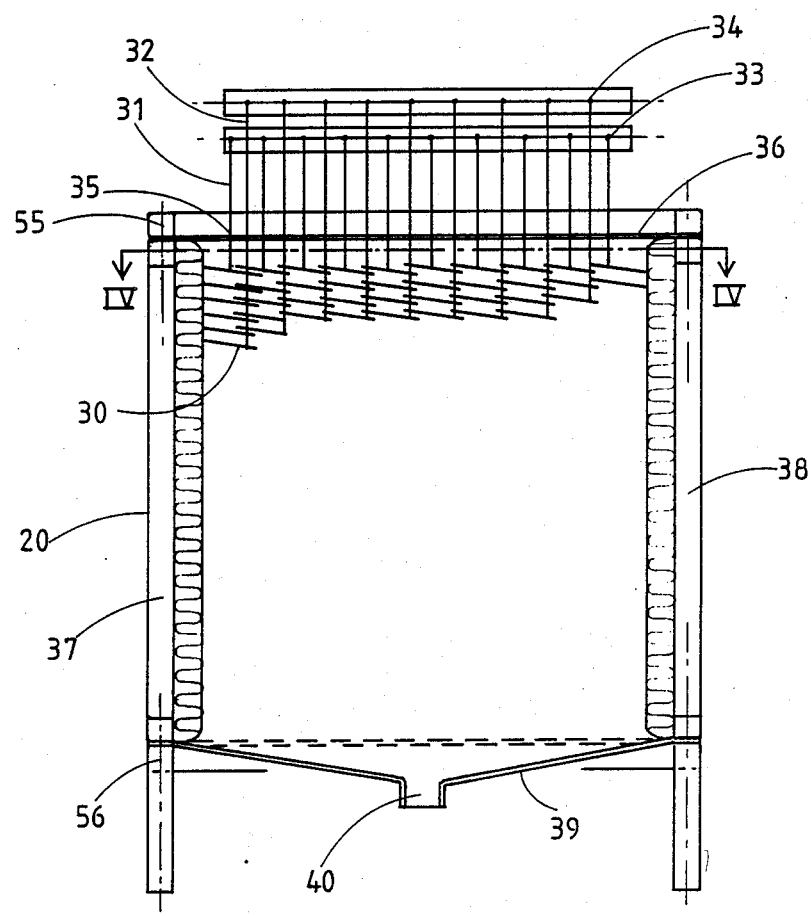

In FIG. 3 there is shown a section through a preferred heat exchanger for use as a flue gas cooler in the apparatus according to FIG. 2. The heat exchanger comprises a plurality of plastic tubes 30, in this case ten tubes placed side-by-side in a row, all of which have a helical form. From each tube two tube ends 31, 32 extend, of which one 31 is connected to a distribution means 33 for medium supply to the tube, the second tube end 32 being connected to a collecting means 34, to which the medium is conducted for further transport after having streamed through the tube 30. The tube ends 31, 32 pass through holes 35 made in a plate 36 of a top module of the casing 20 of the heat exchanger. Thus, the plastic tubes are connected to the means 33, 34 outside the corrosive environment of the heat exchanger. This top plate 36 has qualities allowing the plate to resist the corrosive environment, the working pressure and the temperature in the heat exchanger. A suitable material for the top plate is a plastic material.

The tolerances between the plastic tube 30 and the hole 35 of the plate 36 shall be so small that the tube must be forced through the plate by a certain force. The plate has a certain thickness motivated by the temperature and the pressure inside the heat exchanger. The internal pressure of the plastic tubes together with the temperature of the internal flow results in an increase of the outer diameter of the plastic tubes, whereby a sufficient sealing between the tube and the plate is achieved.

The top plate 36 forms one of the walls delimiting the casing of the heat exchanger. In FIG. 3 three further delimitation walls are shown, i.e. two side walls 37, 38 and a bottom plate 39 provided with a drainage outlet 40. Besides these two side walls 37, 38 there are an inlet module 41 and an outlet module 42 (see FIG. 4) in the heat exchanger, which modules are placed perpendicularly to the side walls 37, 38. In the two modules 41, 42 there are connections 21, 22 for supply and removal, respectively, of one of the media (in this case flue gas) participating in the heat exchange. This medium has in FIG. 4 been indicated by the arrow 43. The plastic tubes and the connections for the medium passing the plastic tubes are so located that the medium streams essentially perpendicularly to the helical plastic tubes.

Figure 4:
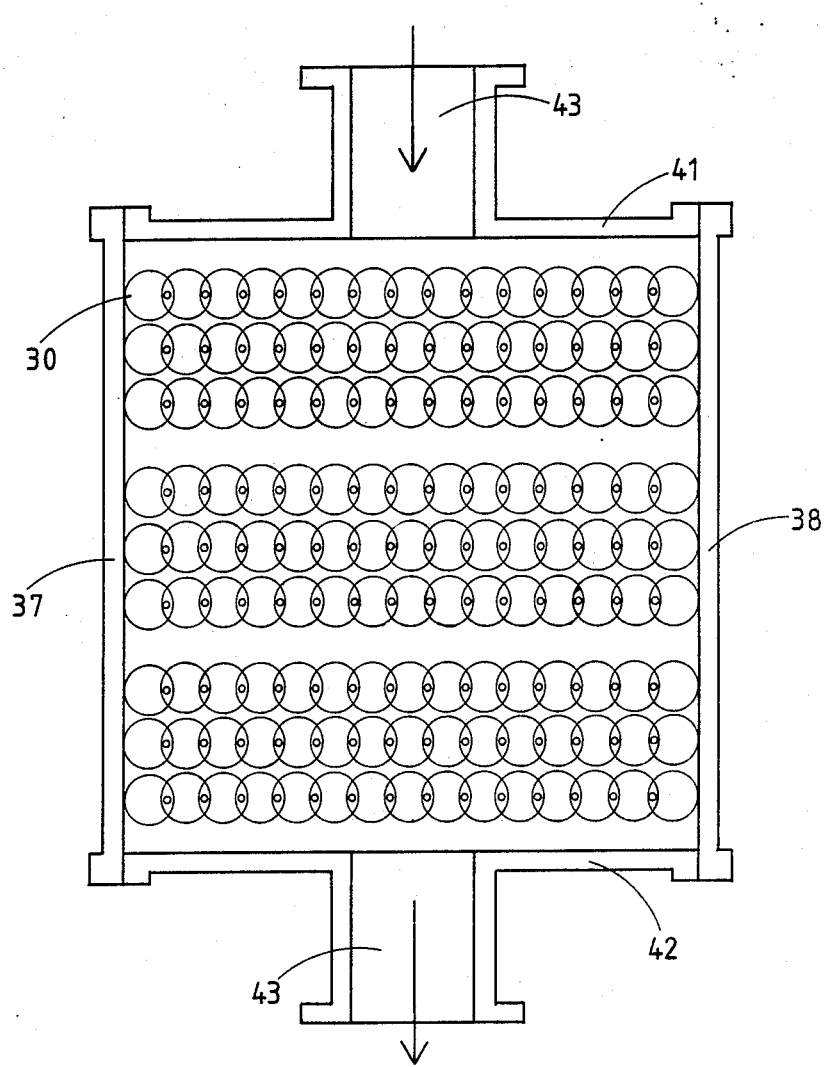

As is shown in FIG. 4 the heat exchanger comprises a plurality os plastic tubes 30 placed in rows after each other inside the casing 20 of the heat exchanger so that the plastic tubes fill out the space inside the casing both in its transversal direction and its longitudinal direction.

Furthermore, the helical plastic tubes are so placed beside each other that they form a row over the essential width of the casing of the heat exchanger, the adjacent helical tubes being so placed that the distance between the centers of two adjacent helical tubes of the mentioned row is less than the sum of the radii of the circles circumscribing the two tubes. Thus, the helical plastic tubes bent to a helical form rest against each other. Furthermore, the plastic tubes in the rows or every other tube in each row are preferably alternately left-hand and right-hand screwed, whereby the different twisting tendencies arising in the plastic tubes can be counteracted. It should be noted that the twisting tendency for right-hand screwed plastic tubes is of one type, while the twisting tendency for left-hand screwed plastic tubes is of opposite type. Due to that fact these twisting tendencies balance each other.

Figure 6:
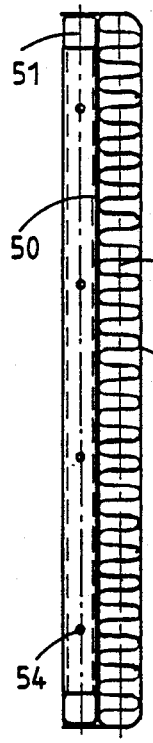
Figure 5:
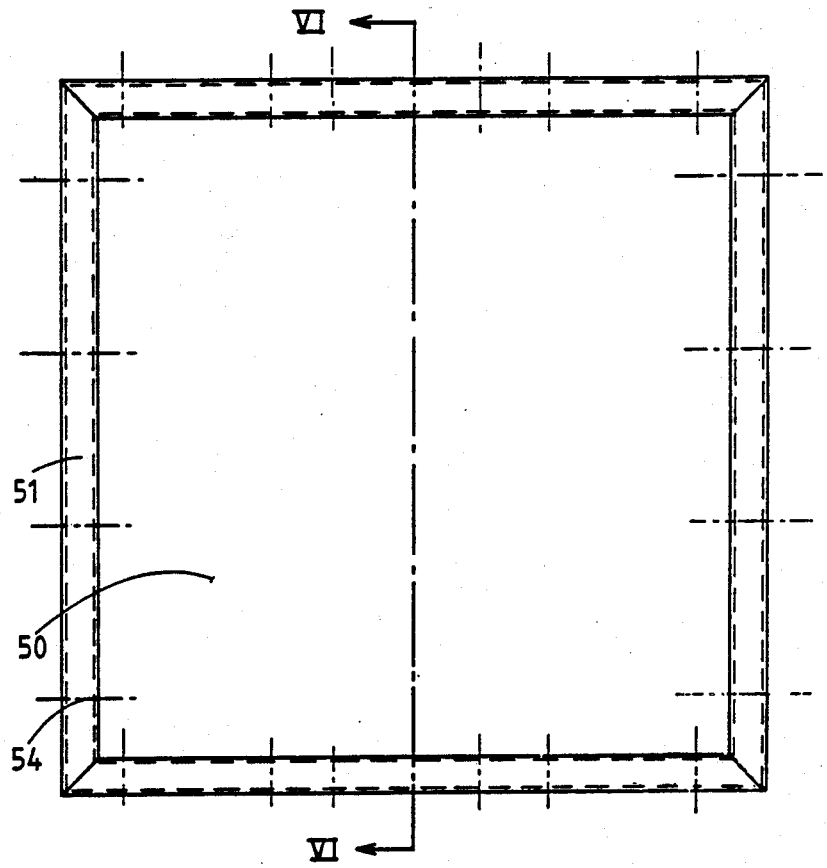

As has been previously mentioned the casing comprises two side walls 37, 38, an inlet 41 and an outlet 42 module, and a bottom 39 and a top 36 module. Each side wall is built up by one or several modules of the kind shown in FIGS. 5 and 6.

Each module comprises a metallic plate 50, which is made of steel and of essentially the same size as the module. One side of the plate 50 is provided with a frame 51 extending round the plate and applied at the periphery of the plate. The other side of the plate 50 is provided with an insulation 52 which is made of a material resisting the aggressive environment and which is covered by a plastic layer 53 made of e.g. polytetrafluoroethylene. The insulation 52 protects the plastic tubes from being in contact with the metal plate 50, whereby the plastic tubes will not be damaged by the warm metallic plate. The layer 53 is kept in place in a suitable way, e.g. by being fastened to the frame 51. The plate 50 is intended to be applied so that the frame 51 is on the outside of the heat exchanger, while the insulating material with the plastic layer is accordingly on the inside of the heat exchanger, where the corrosive environment is. The layer 53 is intended to protect the insulation 52 and the steel plate 50 from corrosion. In the frame 51 holes 54 are made at even intervals intended for bolts when fastening several modules to each other or when fastening a module to the bottom plate or the top plate. For this last purpose also the top plate and the bottom plate are provided with a frame 55 and 56, respectively, extending round the plates (see FIG. 3).

The sealing between two modules and between a module and a top plate/bottom plate is preferably made by a gasket, which is applied between the frames of the respective elements.

The advantage of the arrangement with module and top plate/bottom plate provided with frames is that these elements are easy to assemble, disassemble or reassemble.

In FIGS. 7A and 8A there is shown a preferred embodiment of the invention regarding the location of the different tubes in a row in the heat exchanger.

These figures show that two adjacent helical tubes 71, 72 engage each other so that the distance between the centers 76, 77 of the tubes is less than the sum of the radii of the circles circumscribing the two tubes 71, 72. Each tube has two ends 78, 79, of which the end 78 is intended for supply of the medium going through the tube and the end 79 for taking out the medium after having passed the tube. In this connection the end 79 of the tube 71 comprises a tube leg 71 U extending from the bottom of the heat exchanger and through the top plate 80 of the heat exchanger to the outside of the same.

There is a common space between two adjacent tubes. Thus, in the FIGS. 7 and 8 there is a common space 81 between the tubes 71 and 72. Through this common space and further through the top plate 80 (not shown), the tube leg 73 U of the tube 73 extends. Thus, the two adjacent tubes 71, 72 are locked in relation to each other by the tube leg 73 U of the tube 73. The next tube pair, the tubes 72, 73 is in the same way locked by the tube leg 74 U of the nextcoming tube, i.e. tube 74, and so on. By joining two adjacent tubes in this way, these tubes constitute a self-supporting and a very stable unit which does not need any further support or fastening devices.

I claim:

1. Heat exchange apparatus for recovering heat and separating substances from a flue gas having a casing (20) provided with connections (21, 22) for a first incoming and outgoing medium (43) and comprising inlet and outlet modules (41, 42), side modules (37, 38) and bottom and top modules (39, 36) and heat exchange elements in the form of plastic tubes (30) for a second medium located within said casing, each of said tubes having helical form and two ends (31, 32) intended to be connected to means (33, 34) for incoming and outgoing, medium, the helical, plastic tubes (30) and the connections (21, 22) for the first medium being so arranged that this medium streams essentially perpendicularly to the longitudinal axis of the tubes (30), characterized in that the helical plastic tubes (30) being so located in relation to each other that the distance between the centres of two adjacent tubes is less than the sum of the radii of the circles circumscribing the two tubes, enclosing a common space (81);

two adjacent helical tubes (71, 72) being locked in relation to each other by one end (73 U) of another helical tube (73) being inserted into the common space (81) of the two adjacent tubes (71, 72);

the two ends (31, 32) of each plastic tube (30) going through a plate of the top module (36) of the casing (20) via holes (35) in the plate, each tube end (31, 32) being sealingly applied into the respective hole (35) of the plate;

each side module comprising a metallic plate (50) and insulation (52) covered by a plastic layer (53), the plastic layer being in contact with the first medium (43).

2. Heat exchanger apparatus according to claim 1, characterized in that the plastic tubes (30) are placed in adjacent rows inside the casing (20) of the heat exchanger so that the plastic tubes occupy the space inside the casing both in its transversal direction and its longitudinal direction.

3. Heat exchange apparatus according to claim 2, characterized in that the plastic tubes (30) in each row are alternately left-hand screwed and right-hand screwed.

4. Heat exchange apparatus according to claim 1, characterized in that the insulation (52) comprises foam glass.

5. Heat exchange apparatus according to claim 1, characterized in that the plate of the top module (36) and the layer (53) are made of polytetrafluoroethylene.

* * * * *

UNITED STATES PATENT AND TRADEMARK OFFICE
CERTIFICATE OF CORRECTION

PATENT NO. : 4,909,318

DATED : March 20, 1990

INVENTOR(S) : Gunnar Ymse

Figure 7B:
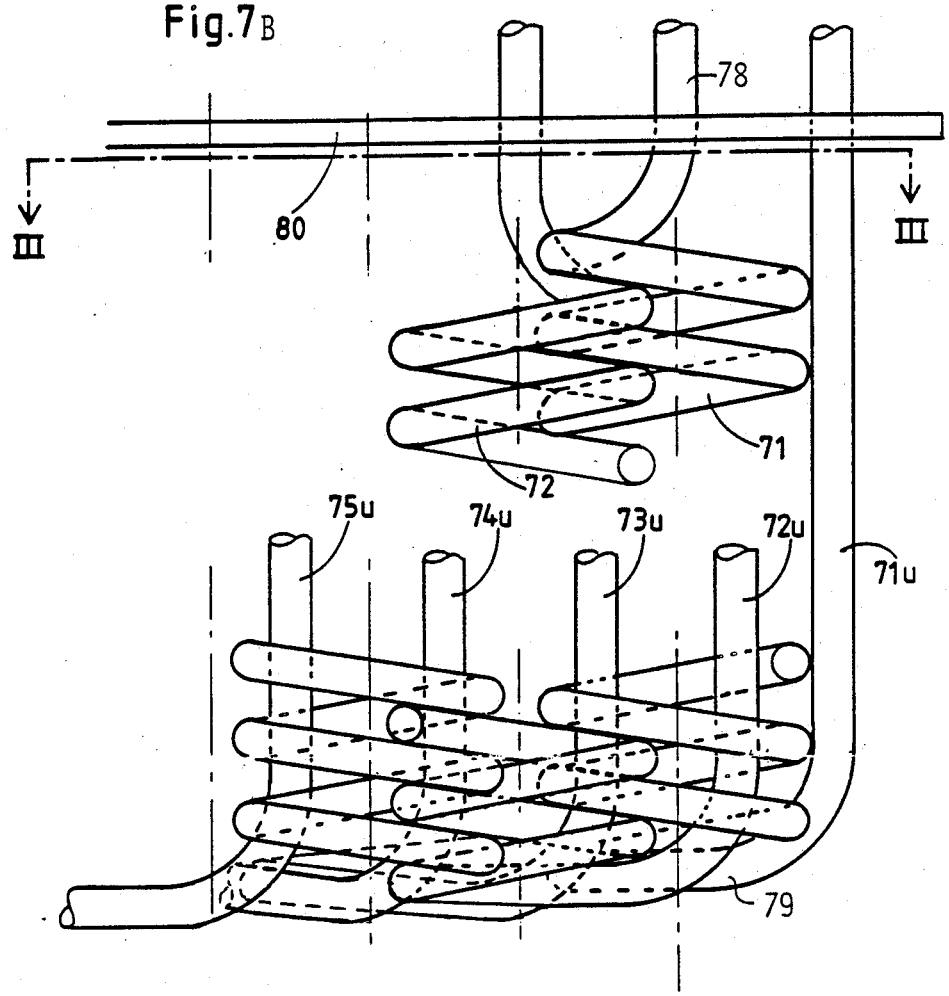
Figure 8B:
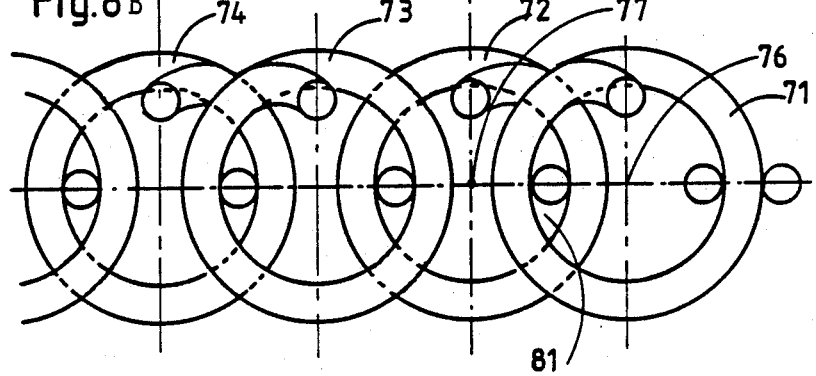
FIG. 8B shows a horizontal section of FIG. 7B taken along the line VIII—VIII.

It is certified that error appears in the above-identified patent and that said Letters Patent is hereby corrected as shown below:

Col. 1, line 39, "commprising" should be --comprising--;

Col. 2, line 7, "3 118 m/sec." should be --3 m/sec.--;

Col. 3, line 44, "IV-IV" should be --VI-VI.--;

Col. 5, line 30, "os" should be --of--;

line 65, delete "being in";

Col. 6, line 16, "elements" should be --element--;

line 25, "engage each other" should be --engage with each other--;

after line 48, insert paragraph as follows:

--Figs. 7B and 8B show an arrangement like that in Figs. 7A and 8A but in which the tubes in each row are alternately left-hand and right hand spirals.--.

Signed and Sealed this

Twenty-fifth Day of June, 1991

Attest:

HARRY F. MANBECK, JR.

Attesting Officer

Commissioner of Patents and Trademarks